United States Patent
Tanner et al.

[11] Patent Number: 6,103,114
[45] Date of Patent: Aug. 15, 2000

[54] POUR-THROUGH WATER TREATMENT CARAFE

[75] Inventors: John D. Tanner; David J. Emmons, both of Plymouth; Brian D. Gale, Fridley, all of Minn.

[73] Assignee: Recovery Engineering, Inc., Minneapolis, Minn.

[21] Appl. No.: 09/005,296

[22] Filed: Jan. 9, 1998

[51] Int. Cl.[7] .......................... B01D 24/02; B01D 24/22; B01D 27/08; B01D 27/02

[52] U.S. Cl. ..................... 210/232; 210/238; 210/266; 210/282; 210/472; 210/474; 210/477

[58] Field of Search .................... 210/232, 477, 210/282, 266, 474, 472, 238

[56] References Cited

U.S. PATENT DOCUMENTS

| | | |
|---|---|---|
| 203,178 | 4/1878 | Miller . |
| D. 331,446 | 12/1992 | Gidman . |
| D. 386,041 | 11/1997 | Tanner . |
| 496,510 | 5/1893 | Dudley . |
| 1,012,680 | 12/1911 | Mayer . |
| 1,032,917 | 7/1912 | Lynch . |
| 1,078,171 | 11/1913 | Shaw . |
| 1,421,622 | 7/1922 | Van Ness . |
| 1,653,214 | 12/1927 | Kempter . |
| 1,703,266 | 2/1929 | Dowling . |
| 2,017,456 | 10/1935 | Gudmundsen . |
| 3,615,016 | 10/1971 | Soriente . |
| 3,747,767 | 7/1973 | Hankammer . |
| 4,306,971 | 12/1981 | Hankammer . |
| 4,477,347 | 10/1984 | Sylva . |
| 4,623,457 | 11/1986 | Hankammer . |
| 4,719,012 | 1/1988 | Groezinger . |
| 5,076,922 | 12/1991 | DeAre . |
| 5,190,643 | 3/1993 | Duncan . |
| 5,234,585 | 8/1993 | Zuk, Jr. . |
| 5,562,824 | 10/1996 | Magnusson . |
| 5,601,711 | 2/1997 | Sklar et al. . |
| 5,635,063 | 6/1997 | Rajan . |
| 5,830,360 | 11/1998 | Mozayeni . |

FOREIGN PATENT DOCUMENTS

| | | |
|---|---|---|
| 241928 | 12/1962 | Australia . |
| 32 35 328 A1 | 3/1984 | Germany . |
| 63-264187 | 11/1988 | Japan . |
| WO 96/22045 | 7/1996 | WIPO . |

OTHER PUBLICATIONS

Color photographs of Pūr pitcher water filter (on sale/in public use prior to Jan. 9, 1997).
Color photographs of Pūr water purification system (on sale/in public use prior to Jan. 9, 1997).
Color photographs of Culligan pitcher system (on sale/in public use prior to Jan. 9, 1997).
Color photographs of Health O Meter pitcher (on sale/in public use prior to Jan. 9, 1997).
Color photographs of Culligan faucet–mounted filter (on sale/in public use prior to Jan. 9, 1997).
Color photographs of Aqua–Pure water filter (on sale/in public use prior to Jan. 9, 1997).
Color photographs of Brita Optimax dispenser (on sale/in public use prior to Jan. 9, 1997).
Color photographs of Brita Ultra Max dispenser (on sale/in public use prior to Jan. 9, 1997).
Color photographs of Rubbermaid dispenser (on sale/in public use prior to Jan. 9, 1997).

*Primary Examiner*—Thomas M. Lithgow
*Attorney, Agent, or Firm*—Merchant & Gould P.C.

[57] ABSTRACT

A pour-through water treatment device. The device comprises a carafe, a pour tray including a lower portion, an outer lid, and an inner lid. The outer lid is sealed to and substantially covers a forward portion of the lower portion, and has a lip extending over an upper edge of the carafe. The inner lid covers an opening in the outer lid for pouring untreated water into the pour tray. A bayonet-type filter locking and sealing arrangement is also disclosed.

12 Claims, 5 Drawing Sheets

POUR-THROUGH WATER TREATMENT CARAFE

FIELD OF THE INVENTION

This invention relates to pour-through water treatment devices. In particular, this invention relates to carafe and pour tray configurations for better separating treated water from untreated water. This invention also relates to a filter locking arrangement for better sealing a filter to a pour tray.

BACKGROUND OF THE INVENTION

Domestic water treatment devices are know in the art. Among these devices are self-contained systems which process water in batches. Examples of batch devices are pitchers/carafes and larger dispensers from which treated water is poured through a spigot. These systems typically have upper and lower chambers separated by a filter cartridge. They are called "pour-through" devices because they rely on gravity to force water from the upper chamber, through the cartridge, and into the lower chamber, thereby producing treated water.

As a result of recent improvements in filter media for pour-through devices, biological contaminants such as protozoan cysts (e.g., cryptosporidium) can now be removed. Successful removal of biological contaminants by the filter cartridge is of no benefit, however, if the treated water becomes contaminated with untreated water. Any contamination is unacceptable because even a small amount of biological contaminant would make all of the treated water unsuitable for drinking.

There are a number of ways that treated water can become contaminated with untreated water in a pour-through device. One way is if there is not an adequate seal between the filter and pour tray. Previously known sealing arrangements have generally involved a radial compression seal created simply by pushing the filter cartridge downwardly into the bottom of the pour tray. This approach provides no ready indication to the user, however, that a seal with good integrity has been achieved.

In carafes, another source of contamination is when pouring treated water out of the carafe. Some untreated water often remains in the pour tray, which can spill out when the carafe is tilted for pouring. If this is not prevented, untreated water from the pour tray can either mix with the treated water coming out of the carafe spout or leak around the pour tray and into the treated water remaining in the carafe.

Users also typically fill carafes by first turning on the faucet and then moving the carafe under it to fill the pour tray. As the edge of the carafe passes under the water stream, untreated water can leak between the top edges of the carafe and pour tray and into the bottom of the carafe. Untreated water can also splash into the pour spout when the pour tray is being filled.

What has been needed are better arrangements for separating treated water from untreated water in pour-through water treatment devices.

SUMMARY OF THE INVENTION

Although a carafe is shown in the preferred embodiment herein, it will be understood that certain aspects of this invention could be employed in other pour-through devices.

In one aspect of the invention, a water treatment device comprises a carafe, into which treated water is received, and a pour tray inserted into the carafe. A lid attached to the pour tray has an opening for pouring untreated water into the pour tray. The lid has a lip extending over an upper edge of the carafe, which prevents untreated water from entering the carafe when the pour tray is being filled.

In another aspect of the invention, a pour tray for a water treatment carafe comprises a lower portion for receiving untreated water. A lid portion substantially covers a forward portion of the lower portion and defines an opening through which untreated water is poured into the lower portion. The lid portion is sealingly connected to the lower portion at the forward portion. This sealing connection prevents untreated water from spilling out of the pour tray when treated water is being poured out of the carafe.

In another aspect of the invention, a water treatment device comprises a carafe, into which treated water is received, and a pour tray inserted into the carafe. The pour tray comprises a lower portion, an outer lid, and an inner lid. The lower portion is for receiving untreated water. The outer lid substantially covers and is sealingly attached to a forward portion of the lower portion. The outer lid has a lip extending over an upper edge of the carafe and has an opening defined therein for pouring untreated water into the pour tray. The inner lid is for covering the opening in the outer lid after the lower portion of the pour tray has been filled.

In another aspect of the invention, a filter sealing arrangement comprises a pour tray having a sleeve at a bottom thereof for receiving a filter, and having a filter sealing surface. The sleeve has a filter locking surface on an inner side. A filter inserted into the sleeve has a corresponding filter locking surface on an outer side and has a corresponding filter sealing surface. One of the locking and corresponding locking surfaces comprises an angled slot, and the other comprises a protrusion for mating with the slot. The angled slot, protrusion and filter sealing surfaces are constructed and arranged so that, as the filter is rotated within the sleeve, the filter becomes sealed to the pour tray.

These and other advantages and features of novelty which characterize the invention are pointed out with particularity in the claims annexed hereto. However, for a better understanding of the invention and its advantages, reference should be made to the drawings which form a further part hereof, and to the accompanying descriptive matter in which there is illustrated and described a preferred embodiment of the invention.

BRIEF DESCRIPTION OF THE DRAWINGS

A preferred embodiment of the present invention will be described with reference to the accompanying drawings, wherein like reference numerals identify corresponding parts.

DETAILED DESCRIPTION OF THE PREFERRED EMBODIMENT

Figure 1:
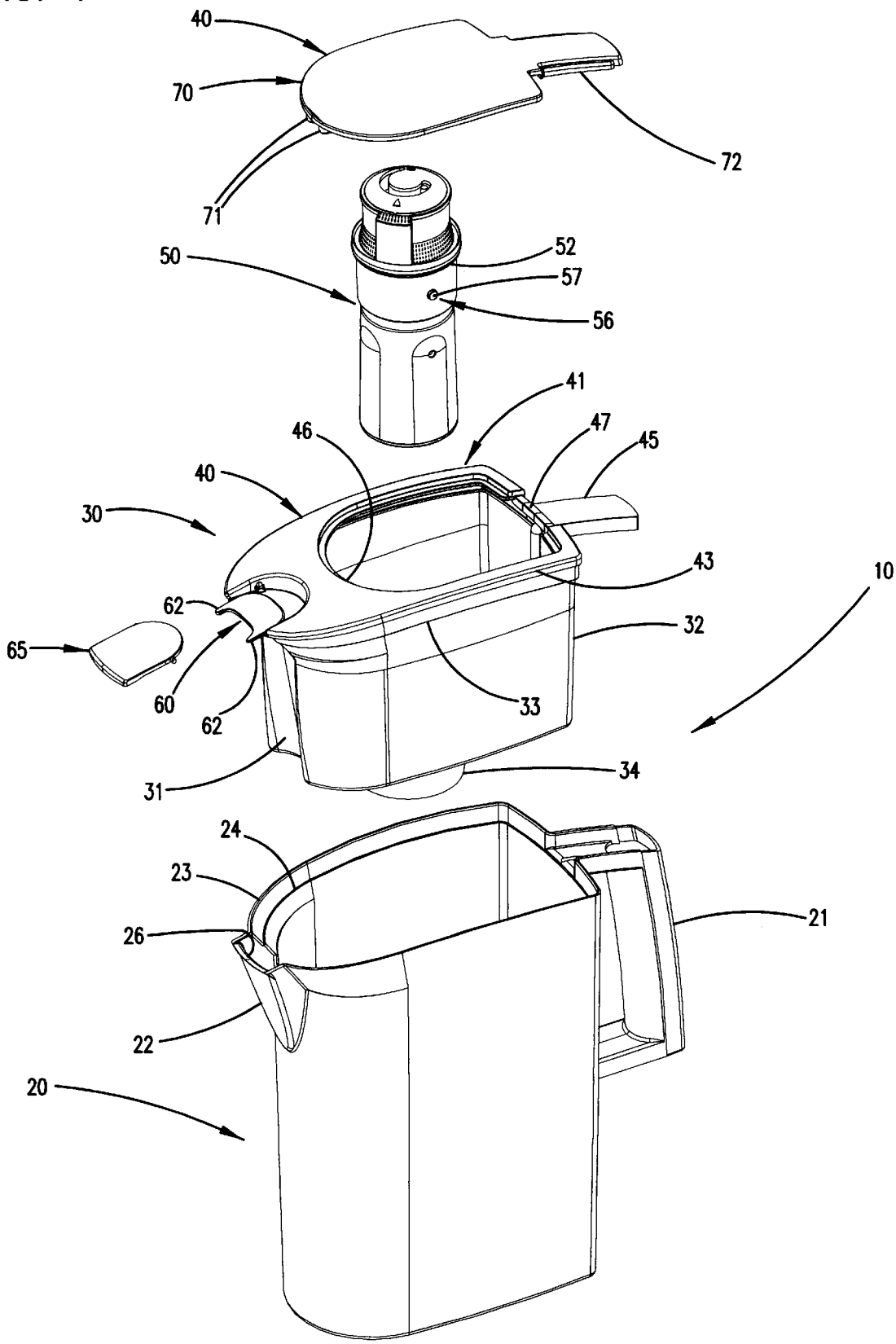
FIG. 1 is an exploded perspective view of a water treatment device according to the present invention.

Water treatment device 10 includes carafe 20, pour tray 30, lid 40 and filter cartridge 50. The device is used as other pour-through devices. Pour tray 30 is filled with tap water. By the force of gravity, water passes through filter cartridge 50 and into carafe 20. In the case of the carafe arrangement described herein, the user picks up the device by handle 21 and pours water out of spout 22 by tilting the carafe.

Figure 2:
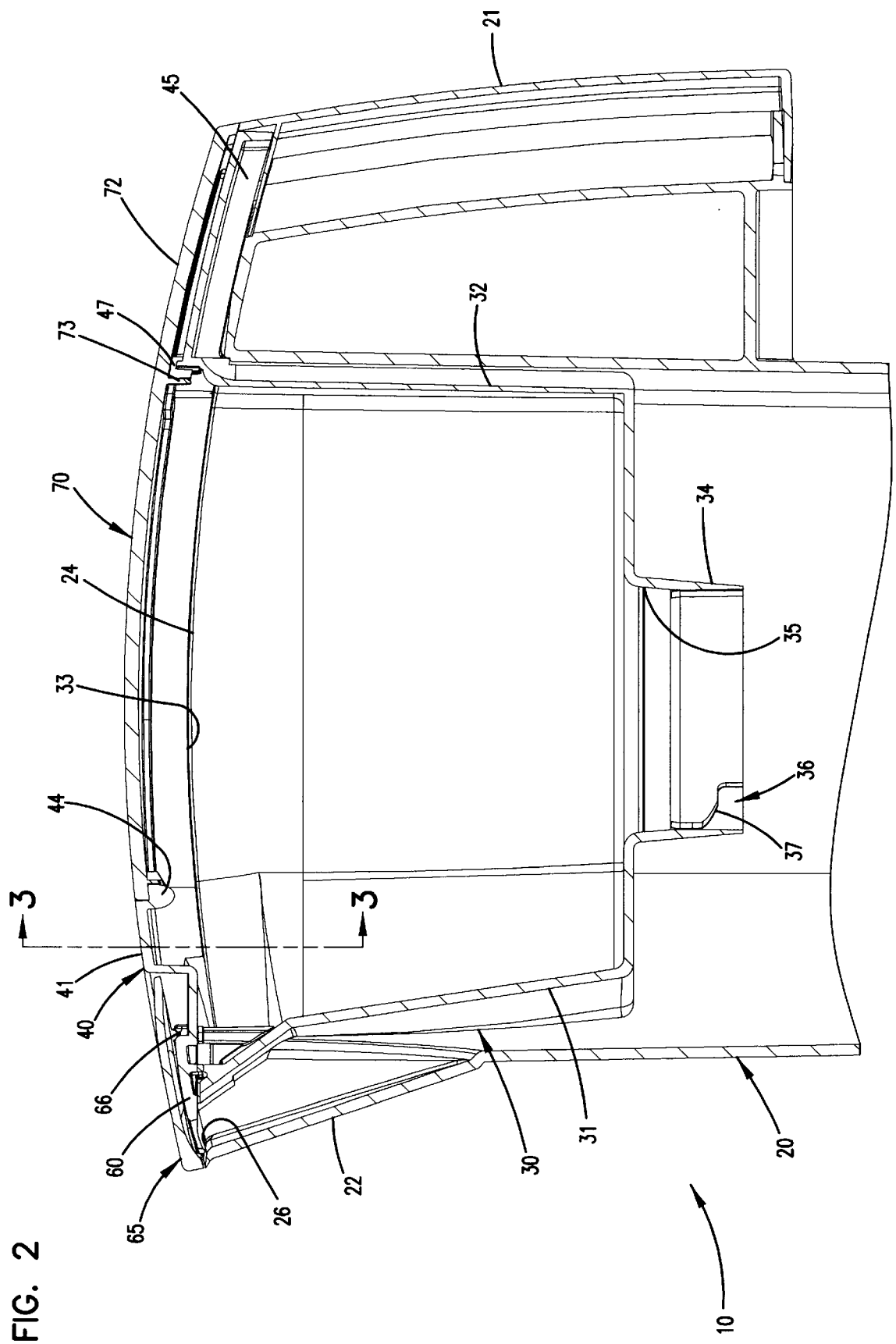
FIG. 2 is a partial cross-sectional view of the device shown in FIG. 1, without the filter.
Figure 3:
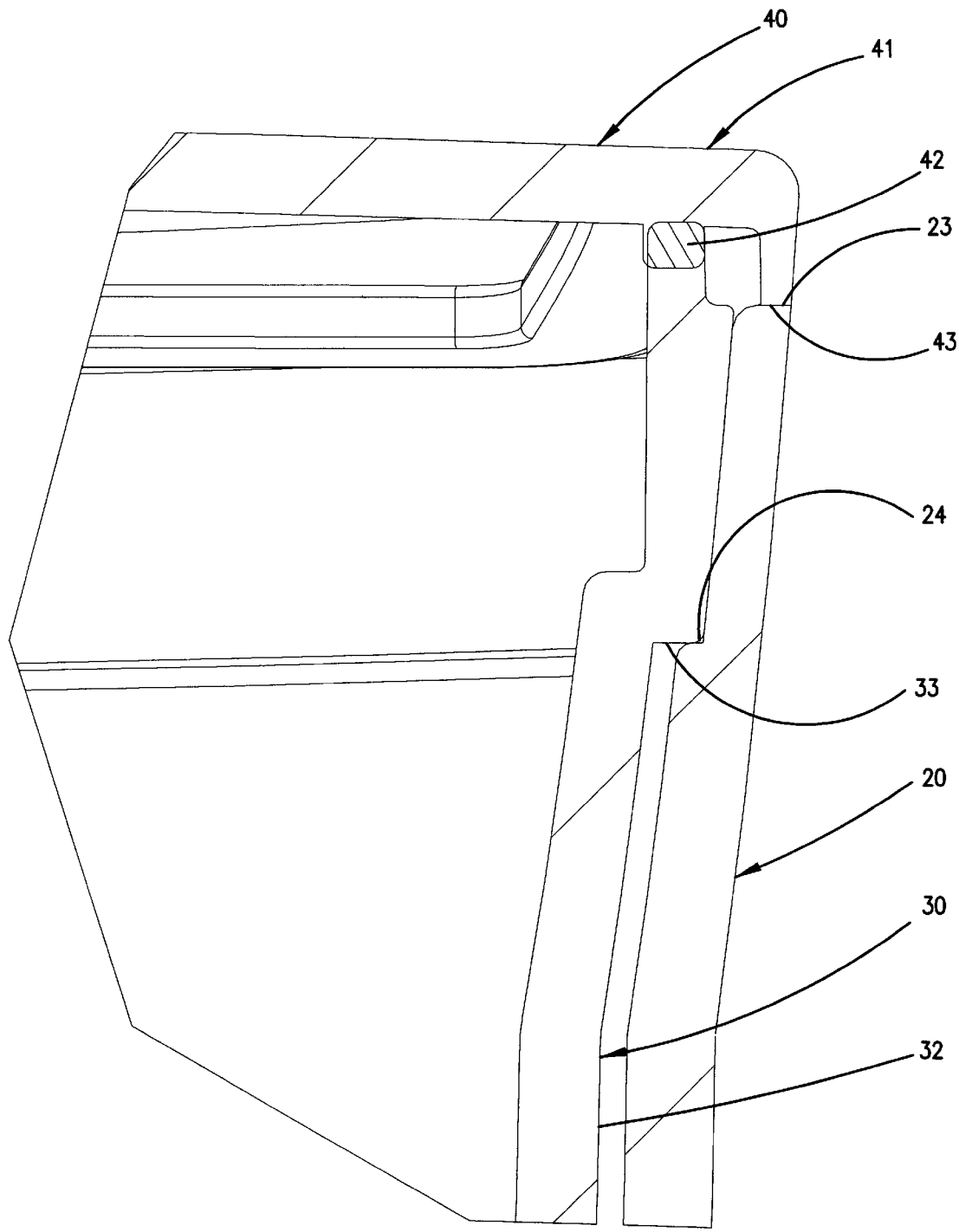
FIG. 3 is an enlarged partial cross-sectional view of the device shown in FIG. 1, taken generally along line 3—3 of FIG. 2.

Referring to FIGS. 1–3, pour tray includes lower portion 32 and lid outer portion 41, which are permanently and sealingly connected together by a hot-melt sealing process. Referring particularly to FIG. 3, the hot-melted area 42 joining the plastic parts is shown, which extends around the entire periphery except at retainer 47.

It is not necessary within the principles of the invention for outer lid portion 41 and pour tray lower portion 32 to be permanently connected. Outer lid 41 could be removable and yet form a seal with pour tray lower portion 32 by use of for example a gasket or a soft rubbery lid.

Outer lid 41 and lower portion 32 also only need to be sealed together in their forward portion (toward the pour spout 22) in order to prevent untreated water from spilling out of pour tray 30 when untreated water is being poured out of carafe 20.

Outer lid 41/lower pour tray 30 assembly has lip 43 extending around its periphery. Lip 43 extends over upper edge 23 of carafe 20 so as to prevent untreated water from entering between carafe 20 and pour tray 30 when pour tray 30 is being filled. Lip 43 in the preferred embodiment includes a portion of outer lid 41 resting on upper edge 23 of carafe 20 (ledge 33 of lower portion 32 also rests on shoulder 24) as shown in FIG. 3, and also includes handle extension 45 resting on top of handle 21. It will be understood that outer lid 41, lip 43 and lower portion 32 could all constitute one part, for example by molding such a configuration as a single part, within the principles of the invention.

Lid 40 includes outer 41 and inner 70 portions. Outer portion 41 has opening 46 therein through which untreated water is poured into pour tray 30. After pour tray 30 has been filled, opening 46 is covered by inner portion 70. Guide 44 on outer portion 41 (see FIG. 2), and tongues 71 on inner portion (see FIG. 1), align and connect the front end of inner portion 70 with outer portion 41. Corresponding retainers 47, 73 also connect inner portion 70 to outer portion 41 at the back of opening 46. Handle extension 72 of inner portion 70 extends over handle extension 45 of pour tray 30.

To assist in more efficiently pouring water out of carafe 20, pour tray lower portion 32 includes spout channel 31 at its front end.

Figure 4:
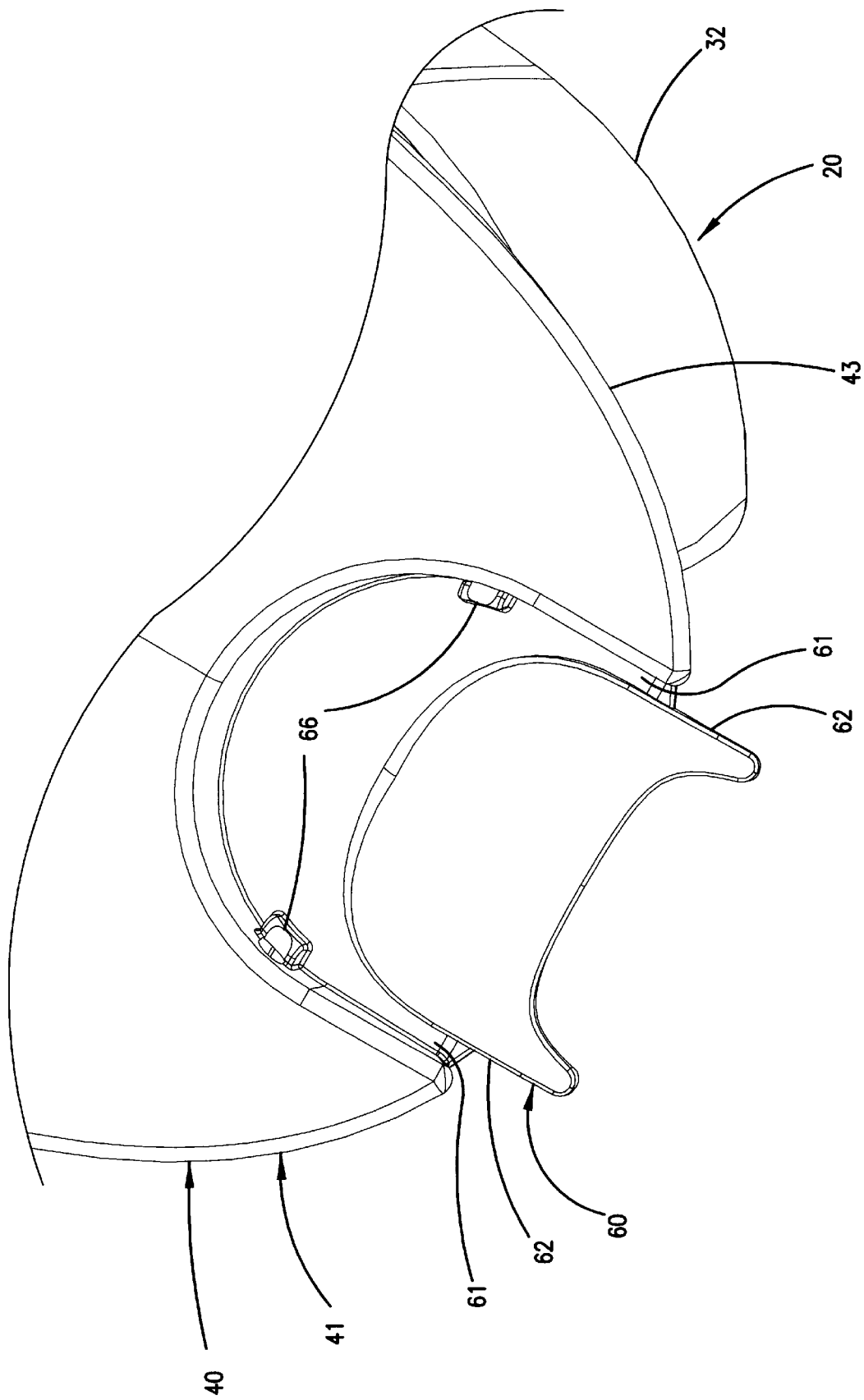
FIG. 4 is an enlarged perspective view of a spout portion of part of the device shown in FIG. 1.

Spout cover 60 is for the purpose of preventing untreated water from entering carafe 20 when untreated water is being poured into pour tray 20, or when treated water is being poured out of carafe 20 (if some untreated water remains on lid 40). Best shown in FIG. 4, spout cover 60 is raised above the surrounding area of lid 40 and includes surfaces 62 for diverting untreated water away from spout opening 26. Gutters 61 formed in lid around spout cover 60 also divert untreated water gathering in the spout area of lid 40 to drain to the outside of carafe spout 22. Spout cover 60 and gutters 61 are molded as part of lid 40, but other arrangements achieving the same purposes could be employed within the principles of the invention.

To further protect treated water in carafe 20 from untreated water and other possible contaminants, pivoting flapper 65 extends over spout opening 26. Flapper is connected to lid 40 via hinges 66, pivoting between a closed position when device 10 is horizontal (when being stored or when pour tray 30 is being filled), and an open position when tilted (when treated water is being poured out of carafe 20).

Device 10 also includes novel filter locking 36, 56 and sealing 35, 52 arrangements for a pour-through device. While a "bayonet"-type locking arrangement is described herein, other arrangements, such as mating threads, could be employed within the principles of the invention.

Figure 5:
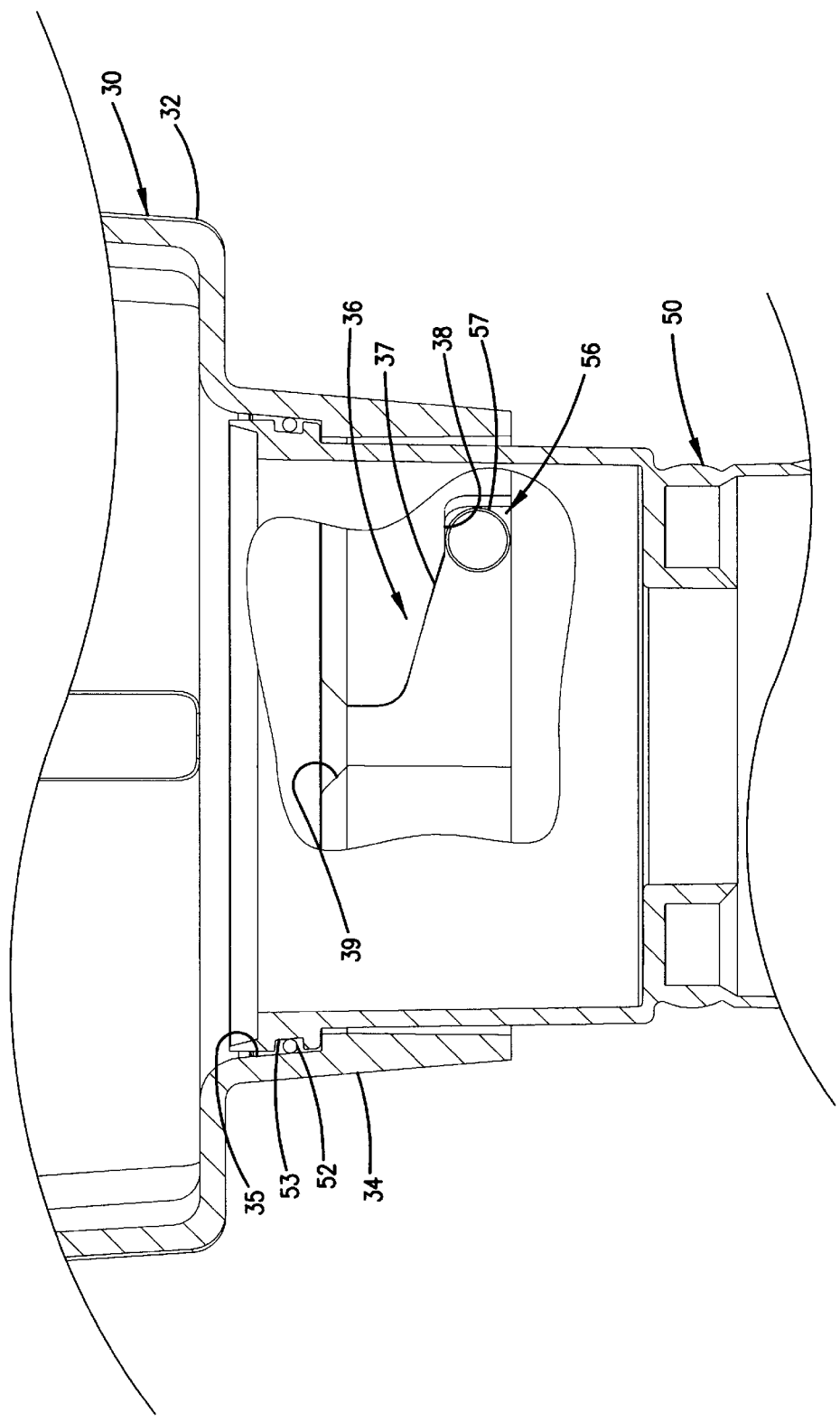
FIG. 5 is a partial cross-sectional view, with portions broken away, of part of the device shown in FIG. 1, showing a filter locking and sealing arrangement according to the present invention.

The locking mechanism of the preferred embodiment of the present invention includes two oppositely arranged angled slots 37 on an inner side of sleeve 34 of pour tray 30 (best shown in FIG. 5), and two corresponding oppositely arranged pins 57 on filter cartridge 50 (see FIGS. 1 and 5). To lock filter cartridge 50 in place, pins 57 are inserted into tapered entry portions 39 of slots 37 and then rotated clockwise until pins 57 snap in place in flat terminal end portions 38 of slots 37. This configuration provides a positive indication to the user that filter 50 has been locked and sealed.

As filter cartridge 50 is locked in place, it is drawn downwardly so that O-ring 52 in channel 53 is compressed against tapered surface 35 of sleeve 34. In this way, a highly reliable radial seal is achieved.

Locking mechanisms 36, 56 and sealing arrangements 35, 52 could be varied in a number of ways within the principles of the invention. Changes could be made in their number, location and shape. For example, pins 57 (or some other protrusion) could instead be on pour tray 30 and angled slots 37 could be on filter cartridge 50. Sleeve 34 could also extend above the bottom of the lower portion 32 of pour tray 30 to provide a surface on which to place a locking or sealing arrangement. The seal could be above instead of below the locking mechanism. Other changes could be made as well.

It should be understood that the present invention is not limited to the preferred embodiment discussed above, which is illustrative only. Changes may be made within the principles of the invention to the full extent indicated by the broad general meanings of the terms in which the appended claims are expressed.

We claim:

1. A water treatment device, comprising:
   (a) a carafe into which treated water is received;
   (b) a pour tray inserted into said carafe;
   (c) a pouring spout out of which treated water is poured from said carafe; and
   (d) a spout cover covering a portion of said pouring spout, comprising a front portion defining a pour spout opening, through which treated water is poured, and an upwardly raised remaining portion configured to divert untreated water away from said pour spout opening.

2. A water treatment device according to claim 1, wherein said spout cover is permanently attached to a lid of said pour tray.

3. A water treatment device according to claim 1, wherein said spout cover is sealingly attached to a lid of said pour tray.

4. A water treatment device according to claim 1, wherein said spout cover further comprises upwardly raised diverting surfaces in said front portion on opposite sides of said pour spout opening.

5. A water treatment device according to claim 1, further including gutters on opposite sides of said spout cover configured to divert untreated water away from said pouring spout.

6. A water treatment device according to claim 1, wherein said spout cover is constructed to remain in a fixed position when treated water is being poured out of said carafe.

7. A water treatment device, comprising:
   (a) a carafe into which treated water is received;

(b) a pour tray inserted into said carafe;

(c) a pouring spout out of which treated water is poured from said carafe; and (d) a diverting surface for diverting untreated water away from said pouring spout, comprising a front portion defining a pour spout opening, through which treated water is poured, and an upwardly raised remaining portion.

8. A water treatment device according to claim 7, wherein said diverting surface is permanently attached to a lid of said pour tray.

9. A water treatment device according to claim 7, wherein said diverting surface is sealingly attached to a lid of said pour tray.

10. A water treatment device according to claim 7, wherein said diverting surface comprises upwardly raised surfaces in said front portion on opposite sides of said pour spout opening.

11. A water treatment device according to claim 7, further including gutters on opposite sides of said diverting surface configured to divert untreated water away from said pouting spout.

12. A water treatment device according to claim 7, wherein said diverting surface is constructed to remain in a fixed position when treated water is being poured out of said carafe.

* * * * *